United States Patent
Maravilla

[15] 3,650,786
[45] Mar. 21, 1972

[54] OIL WELL CEMENT AND METHOD OF MAKING THE SAME

[72] Inventor: Sam Maravilla, Lansing, Ill.

[73] Assignee: United States Steel Corporation

[22] Filed: June 18, 1969

[21] Appl. No.: 834,538

[52] U.S. Cl.................................106/98, 106/100
[51] Int. Cl........................................C04b 7/02
[58] Field of Search.................106/63, 98, 100, 120

[56] References Cited

UNITED STATES PATENTS

| | | | |
|---|---|---|---|
| 2,015,446 | 9/1935 | Cape et al. | 106/63 |
| 2,210,326 | 8/1940 | Pitt et al. | 106/63 |
| 3,145,774 | 8/1964 | Patchen | 106/98 |
| 3,336,143 | 8/1967 | Van Dreser et al. | 106/63 |

Primary Examiner—James E. Poer
Attorney—Martin J. Carroll

[57] ABSTRACT

A cement composition for deep oil wells comprising sintered dicalcium silicate, uncombined calcium oxide, and silica. A method of making the cement in which a mixture of limestone and sand is sintered. For best efficiency the sintering is at a temperature between 2,500° and 2,560° F., and the raw mixture is proportioned to yield a sinter whose primary constituent has a molecular ratio of approximately 2 CaO to 1 $SiO_2$. If the uncombined CaO in the sinter is below 2 percent, additional CaO is added. Silica is also added to the sinter.

11 Claims, No Drawings

OIL WELL CEMENT AND METHOD OF MAKING THE SAME

This invention relates to an oil well cementing composition and to a method of making a sinter for use in the cementing composition, and a method of making the cementing composition. The composition is particularly for use in a slurry for deep oil wells in which temperatures over 200° F. are present. Oil well cement slurries must have a retarded set since substantial time is required to pump them to their position of use. Those oil well cements of which I have knowledge require the addition of retarding agents to conventional Portland cements. These cements have various disadvantages such as non-uniformity and unpredictability of slurry behavior when exposed to oil well temperatures and pressures, and the cost of providing additives.

It is therefore an object of my invention to provide a uniform oil well cement composition which has an adequate rate of hardening and an adequate rate of set at oil well temperatures and pressures.

Another object is to provide such a cement which does not require a retarding agent.

Still another object is to provide such a composition which, when combined with water to form a slurry, will not foam.

A further object is to provide an efficient method of making sinter for use in my improved cement.

A still further object is to provide a method of making the cement of my invention.

These and other objects will be more apparent after referring to the following specification.

I have found that sintered dicalcium silicate, when primarily in beta form, can be combined with calcium oxide and silica to be used as an oil well cement when ground to a fine powder. While dicalcium silicate is one of several minerals produced in the manufacture of Portland cement clinker, it has never been used as an oil well cement except with a substantial amount of tricalcium silicate. However, I have found that a finely ground composition consisting of 90 to 98 parts of dicalcium silicate primarily in beta form, 10 to two parts of calcium oxide, with the total number of parts of the dicalcium silicate and calcium oxide being approximately 100, and from 30 to 90 parts of silica can be used as an oil well cementing composition. All parts and percentages here and hereafter are by weight. Such a composition, when used in a slurry, will have a retarded set at ordinary temperature and, after it is in place, hydration will proceed at a sufficient rate to satisfy American Petroleum Institute (API) requirements due to the presence of heat and pressure in the oil well. The calcium oxide in the composition may be supplied as a residual component in the sintered dicalcium silicate and/or as an addition to the sinter. The cement is preferably made as follows: A raw mix of limestone (essentially $CaCO_3$) and sand (essentially $SiO_2$) in the required proportions to make dicalcium silicate are mixed together uniformly and pelletized in any standard manner. The raw mix proportions to obtain essentially dicalcium silicate (mostly beta, but some gamma) should be such as to yield a sinter whose primary constituent has a molecular ratio of approximately $2CaO$ to $1 SiO_2$ although this ratio may vary somewhat. It is preferred to pre-grind lake sand to pass 200 mesh and the limestone to pass 20 mesh. Then the raw mix consisting of $-20$ mesh limestone and $-200$ mesh sand in the correct molecular ratio plus 0.5 percent boric acid and 0.2 percent Methocel each by weight of the combined limestone and sand are interground so that 98.5 percent will pass 200 mesh. Boric acid is a mineral stabilizer for $B-C_2S$ and inhibits its inversion to the gamma form. Other well known stabilizers, such as borax and chromium oxide, may be used in place of the boric acid. The composition of the limestone and sand may be as shown in Table I.

TABLE I

|  | Limestone % | Sand % |
| --- | --- | --- |
| $SiO_2$ | 0.60 | 87.50 |
| $Al_2O_3$ | 0.62 | 5.30 |
| $Fe_2O_3$ | 0.10 | 1.90 |
| CaO | 54.4 | 1.40 |
| MgO | 0.65 | 0.40 |
| Loss on Ignition | 43.5 | 0.86 |
| Total Alkalies ($k_2O + Na_2O$) | Nil | 2.21 |
| Total | 99.87 | 99.57 |

The pellets are then dried and heated rapidly to a temperature between 2,500° and 2,560° F. preferably between 2,510° and 2,550° F. This may be done in a conventional rotary kiln with the maximum temperature being substantially below that required in making conventional Portland cement. When using the composition of Table I, a sinter is produced consisting of 2.6 percent uncombined CaO and the remainder substantially beta dicalcium silicate. The sinter is then ground to between 1,200 and 3,000 $cm^2/g$. and preferably between 1,300 and 1,500 $cm^2/g$. Wagner fineness. To this is added preferably 40 parts by weight of silica flour, such as Ottawa quartz sand, ground to the same fineness as the sinter. Minor oxides which are present in normal Portland cement may also be present, but have no significant effect on the composition. The composition is then mixed with water in the usual manner for use in oil wells.

The cement of my invention may also be prepared by providing a sinter consisting essentially of dicalcium silicate and having less than 2 percent uncombined calcium oxide. To this is then added sufficient calcium oxide to raise its percentage to at least 2 percent.

Table II identifies test samples of ground sinter referred to hereinafter. Samples 12 and 13 are conventional. Samples E, F, and G were prepared from 76 lb. of limestone and 24 lb. of sand having the analysis shown in Table III to which 0.5 lb. of boric acid was added. Samples F and G were sintered at a temperature of 2,785° ±20° F. while Sample E was sintered at a temperature of 2,530° ±20° F. with other conditions being the same.

TABLE II

| Test Samples | Passing 325 M % | $B-C_2S$ Sample Wagner Specific Surface $cm^2/g$ | Uncombined CaO in Sinter % |
| --- | --- | --- | --- |
| A | 80.0 | 1770 | 3.0 |
| B | 83.4 | 2080 | 3.0 |
| C | 71.7 | 1495 | 2.3 |
| D | 63.0 | 1320 | 4.1 |
| E | 79.8 | 1290 | 2.6 |
| F | 77.8 | 1250 | 0.6 |
| G | 77.8 | 1250 | 0.6 |
| 1 to 11 | 66.0 | 1260 | 5.3 |
| 12 & 13 | 78.2 | 1365 | — |
| 14 & 15 | 81.2 | 1265 | 0.6 |

TABLE III

|  | $SiO_2$ | $Al_2O_3$ | $Fe_2O_3$ | CaO | MgO | Loss on ignition | Total alkalies | Other minor constituents |
| --- | --- | --- | --- | --- | --- | --- | --- | --- |
| Limestone | 0.60 | 0.2 | 0.10 | 54.4 | 0.65 | 44.0 | Nil | 0.05 |
| Sand | 87.50 | 5.30 | 1.90 | 1.40 | 0.40 | 0.86 | 2.21 | 0.43 |

Table IV shows the results of thickening time and compressive strength tests performed according to API recommended practice for oil well cements on cements of my invention produced in various ways. The silica flour added had a 1,400 cm.²/g. Wagner specific surface and 60.6 percent passed 325 mesh. There was not sufficient sinter to perform the 24 hr. pressure test on samples A and B. The terms "poises," "units of consistency" and "Uc" are used interchangeably to denote consistency of cement slurry.

TABLE IV

| Test sample | Uncombined CaO in sinter, percent | Water/solids ratio | API sched. 9, 16,000 ft., thickening time, 70 poises, hr.:min. | Compressive strength, p.s.i., 2" cubes, API Schedule 9S-320 F, 3,000 p.s.i. curing pressure | |
|---|---|---|---|---|---|
| | | | | 8 hr. | 24 hr. |
| A | 3.0 | 0.900 | 4:12 | 695 | |
| B | 3.0 | 0.940 | 3:36 | 940 | |
| C | 2.3 | 0.547 | 3:19 | 1,220 | 2,185 |
| D | 4.1 | 0.507 | 3:15 | 2,050 | 3,375 |
| E | 2.6 | 0.506 | 3:44 | 845 | 4,060 |
| F | 0.6 | 0.500 | 3:19 | 670 | 5,490 |
| G | 0.6 | 0.500 | 4:06 | 790 | 5,950 |
| API Class F minimum requirements | | | [1] 3:10 | 500 | 1,000 |

[1] At 100 $U_c$.

In Table IV Sample F has 2.5 percent added CaO as CaO, Sample G has 2.6 percent added CaO as Ca(OH)₂ while the remaining samples have no added CaO. In all the test samples, silica flour in an amount equal to 40 percent by weight of the sinter was added.

Table V shows the results of tests with various percentages of silica added to the sinter or, in the case of test samples 12 and 13, to conventional ASTM Type II cement.

It will be seen that my cement may be made either by making a sinter having the required uncombined calcium oxide and adding silica thereto or by making a sinter having an uncombined calcium oxide content of less than that required and adding both silica and calcium oxide and/or calcium hydroxide thereto. The first method is preferred because of the lower cost of production.

The composition is mixed with water in the usual manner for use in deep oil wells.

While it is preferred to pelletize the raw mix for various reasons, such as minimizing dust losses, obtaining uniform chemical composition and obtaining more uniform burning, I have found that my invention can also produce suitable cements when a powdered raw mix is sintered. In this case I have found that the sintering should be done at a temperature between 2,400° and 2,500° F. This method has the advantage that no special pelletizing equipment is required.

TABLE V

| Test sample | Added silica flour, percent of sinter | Mixing water, water/solids ratio | Pan American thickening-time tester, API schedule 9–16,000 ft. casing cementing | | | | Compressive strength 2" cubes, p.s.i., API schedule 9S, 320° F., 3,000 p.s.i. curing pressure | |
|---|---|---|---|---|---|---|---|---|
| | | | Consistency, $U_c$ | | Thickening time, hr.: min. | | | |
| | | | Initial | 15–30 min. | 70 $U_c$ | 100 $U_c$ | 8 hr. | 24 hr. |
| 1 | 0 | 0.380 | | | | | 125 | 1,265 |
| 2 | 10 | 0.404 | Test not made | | | | 225 | 2,810 |
| 3 | 15 | 0.396 | | | | | 325 | 5,650 |
| 4 | 20 | 0.435 | 10 | 16 | 1:44 | 1:51 | 555 | 4,690 |
| 5 | 30 | 0.435 | 8 | 8 | 3:22 | 3:24 | 1,200 | 5,750 |
| 6 | 40 | 0.435 | 2 | 4 | 3:30 | 3:42 | 1,660 | 5,525 |
| 7 | 50 | 0.435 | 6 | 7 | 3:21 | 3:26 | 1,620 | 5,125 |
| 8 | 60 | 0.435 | 5 | 5 | 3:28 | 3:31 | 1,695 | 3,390 |
| 9 | 70 | 0.427 | 5 | 5 | 3:14 | 3:22 | 1,670 | 2,915 |
| 10 | 80 | 0.421 | 6 | 6 | 3:10 | 3:17 | 1,510 | 2,450 |
| 11 | 90 | 0.421 | 5 | 5 | 3:26 | 3:39 | 1,370 | 2,585 |
| 12 | 0 | 0.380 | 10 | 36 | 0:36 | 0:38 | 3,685 | 1,980 |
| 13 | 40 | 0.395 | 7 | 19 | 0:42 | 0:44 | 2,225 | 8,940 |
| API Class F requirements | | | [1] 30 | | [2] 3:10 | | [2] 500 | [2] 1,000 |

[1] Maximum.
[2] Minimum.

Table VI shows the results of adding calcium hydroxide and silica flour to ground sinter samples corresponding to test samples F and G, respectively.

In carrying out my experiments with a powdered feed I used sand identical to that of Table I and limestone as close to that of Table I as possible. The only difference was the negligible

TABLE VI

| Added Ca(OH)₂ percent of sinter [1] | Total uncombined CaO adjusted CaO², percent | Added silica flour [1] percent of sinter | Mixing water, water/solids ratio | Thickening time tester, API Schedule 9–16,000 ft. | | | | Compressive strength 2" Cubes, p.s.i., API Schedule 9S, 320 F, 3,000 p.s.i. curing pressure | |
|---|---|---|---|---|---|---|---|---|---|
| | | | | Consistency, $U_c$ | | Thickening time, hr.:min. | | | |
| | | | | Initial | 15–30 min. | 70 $U_c$ | 100 $U_c$ | 8 hr. | 24 hr. |
| 1.85 | 2.0 | 90 | 0.435 | 6 | 4 | 3:44 | 4:07 | 1,025 | 2,550 |
| 13.10 | 10.0 | 90 | 0.435 | 6 | 13 | 2:59 | 3:14 | 2,210 | 6,340 |
| API Class F requirements | | | | [3] 30 | | [4] 3:10 | | [4] 500 | [4] 1,000 |

[1] By weight of B-C₂S sinter.
[2] Includes CaO added as Ca(OH)₂ plus residual or uncombined CaO in sinter.
[3] Maximum.
[4] Minimum.

one of the $Al_2O_3$ content being 0.20 percent instead of 0.62 percent.

Test Samples 16, 17, and 18 were made with Sample 16 being sintered at an average temperature of 2,455° F., Sample 17 at an average temperature of 2,420° F. and Sample 18 at an average temperature of 2,405° F. To each sample was added 40 percent by weight of silica flour by intergrinding the sinter and silica flour. A slurry was made with the water/solids ratio of each sample being 0.435. Table VII shows the thickening time and strength data for these samples comparable to Tables IV and V.

TABLE VII

| Test Sample: | Uncombined CaO in Sinter, percent | API Sched. 9 16,000 ft. thickening time, 70 poises hr.: min. | Compressive Strength-p.s.i. 2" Cubes API Schedule 9S-320F | |
|---|---|---|---|---|
| | | | 3,000 p.s.i., curing 8 hr. | Pressure, 24 hr. |
| 17 | 1.7 | 5:00+ | 320 | 1,425 |
| 18 | 4.2 | 5:53 | 565 | 2,250 |
| 19 | 8.8 | 4:26 | 815 | 3,410 |

It will be seen that Test Sample 17 does not meet the minimum API compressive strength requirement at 8 hours, but this merely requires the addition of sufficient CaO to bring the total uncombined CaO content to 2 percent. The cement of Test Sample 18 is preferred.

I have found that the sinter produced using a powdered feed has more minor constituents than a sinter produced using a pellet feed. For example, the sinter of Test Sample 18 has a CaO to $SiO_2$ ratio of only 1.61 percent as compared to a ratio of 1.97 for Test Sample 6.

The cements produced according to any of the above methods must contain from 90 to 98 parts by weight of sintered dicalcium silicate, between 10 and two parts by weight of uncombined calcium oxide, the total number of parts of dicalcium silicate and calcium oxide being 100, from 30 to 90 parts by weight of silica, and the remainder minor constituents normally present in Portland cements.

While several embodiments of my invention have been described, it will be apparent that other embodiments and compositions may be made.

I claim:

1. The method of making an oil well cement containing from two to 10 parts by weight of uncombined CaO, 98 to 90 parts by weight of dicalcium silicate, from 30 to 90 parts of silica and minor constituents, which method comprises sintering a raw mixture of ground limestone and sand in the correct molecular ratio to obtain dicalcium silicate, then grinding said sinter, and adding silica flour to said sinter.

2. The method of claim 1 in which the raw mixture is proportioned to yield a sinter whose primary constituent has a molecular ratio of approximately 2 CaO to 1 $SiO_2$.

3. The method of claim 1 which includes adding a mineral stabilizer to the raw mixture, and in which the sintering is at a temperature between 2,400° and 2,600° F.

4. The method of claim 1 which includes adding at least one compound of the class consisting of CaO and $Ca(OH_2)$ to the sinter.

5. The method of claim 1 which includes pelletizing the raw mix, and in which the sintering is at a temperature between 2,500° and 2,560° F.

6. The method of making a sintered product containing from 2 to 10 percent by weight uncombined CaO and the remainder essentially dicalcium silicate and minor constituents, which method comprises sintering a dry unbonded mixture in the form of small particles consisting essentially of limestone and sand by rapidly heating the mixture to a temperature between 2,400° and 2,600° F. said raw mixture being proportioned to yield a sinter whose primary constituent has a molecular ratio of approximately 2 CaO to 1 $SiO_2$.

7. The method of claim 6 which includes adding a mineral stabilizer to the raw mixture.

8. The method of claim 7 which includes pelletizing the raw mix, and in which the sintering is at a temperature between 2,500° and 2,5600° F.

9. A finely ground oil well cementing composition consisting of 90 to 98 parts by weight of sintered dicalcium silicate, between 10 and two parts by weight of uncombined calcium oxide, the total number of parts of dicalcium silicate and calcium oxide being 100, from 30 to 90 parts by weight of silica and the remainder minor constituents normally present in Portland cements.

10. An oil well cementing composition according to claim 9 in which the components have a Wagner fineness between 1,200 and 3,000 cm²/g.

11. An oil well slurry consisting of the composition of claim 10 and water.

* * * * *